P. DAVIS.
WINDMILL.
No. 2,215. Patented Aug. 11, 1841.
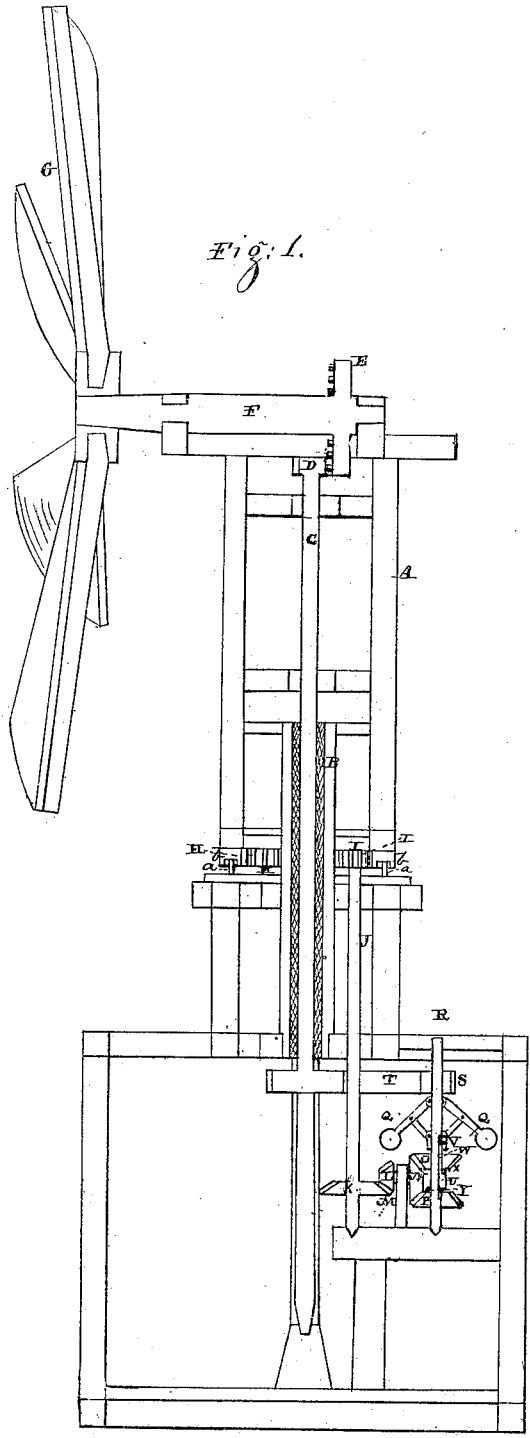
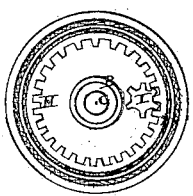
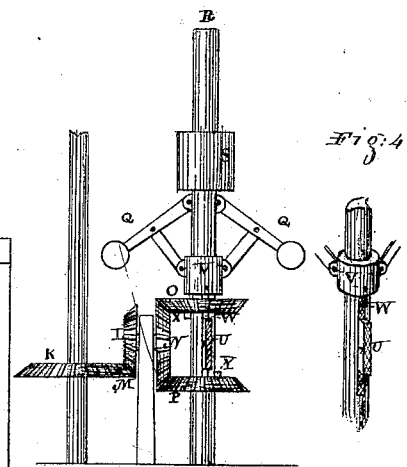

UNITED STATES PATENT OFFICE.

PERRY DAVIS, OF FALL RIVER, MASSACHUSETTS.

WINDMILL.

Specification of Letters Patent No. 2,215, dated August 11, 1841.

*To all whom it may concern:*

Be it known that I, PERRY DAVIS, of Fall River, in the county of Bristol and State of Massachusetts, have invented a new and useful Improvement in Windmills, which is described as follows, reference being had to the annexed drawings of the same, making part of this specification.

Figure 1 is a sectional view of the windmill taken at the center of the same. Fig. 2, section of the governor on a larger scale. Fig. 3, plan of cogged rim and pinion for turning the tower Fig. 4.

Similar letters refer to corresponding parts.

This invention and improvement consists in constructing a movable tower A, around a stationary hollow column B above the roof of the building over which the windmill is to be placed, which hollow column is framed and braced firmly to the roof of the building over which it is to be placed, and through it passes the vertical shaft $c$ of the windmill which is geared by cogged gearing D E to the horizontal shaft F of the wind wheel G in the usual manner, and in arranging a cogged wheel or rim H at the lower end of the tower and moving with it being fixed thereto, into whose cogs (which are on the inner periphery of the rim) there works a pinion I fixed to the upper end of another parallel vertical shaft J on the other end of which is fixed a horizontal bevel cog wheel K into which works a vertical bevel pinion L fixed on a short horizontal shaft M on which is fixed a vertical bevel wheel N into which is made to gear two sliding horizontal bevel pinions O P alternately according to the speed of the wheel, governed by a governor Q (in the manner hereafter described) which last mentioned pinions turn loosely upon a third vertical parallel shaft R until locked to it by a cam and pins (as hereafter described) on which there is a pulley S and connected to the main shaft $c$ by a band T or cogged gear for the purpose of turning the tower A with the wind wheel G to or from the wind, according to the strength of the wind by means of the governor Q made in the usual manner and attached to a slide W, placed in a groove in the shaft R by a movable ring V moved up and down by the governor, on which slide there is a cam U which when the wind blows strong, is raised by the extension of the governor balls against a pin X in the under side of the upper bevel pinions O which thus locks it to the shaft R and causes it to turn with it and being always in gear with the vertical bevel wheel N causes it, with its shaft M, and pinion L to turn and likewise the horizontal bevel wheel K which turns the vertical shaft J and pinion I which is in gear with the cogged rim H and this causes the tower to which it is fixed and the wind wheel to turn round from the direct action of the wind and thus its speed is partly arrested and when it moves at a speed below that which is required the balls of the governor descend and with it the ring and slide which brings its cam U in contact with the pin Y inserted in the upper side of the lower bevel pinion P and thus gears it to the shaft R and causes the gear to turn in a contrary direction which brings the tower around to its former position and the wind wheel again to the direct action of the wind as before. But while the wheel moves at an ordinary speed determined by the position of the governor the two horizontal bevel pinions will be in gear with the bevel wheel but without producing any effect as they move loosely on the vertical shaft R without their pins X Y touching the cam U on the slide W and when the speed of wind wheel is increased or decreased beyond what is required then the cam is made to act on the pins of the pinion by means of the governor in the manner before described for the purpose of again regulating the movements. The arms of the vanes are held between two circular heads or clamp plates bolted together, in which, on their inner faces coming together, are made mortises to receive said arms and which plates are fixed to the outer end of the horizontal shaft F.

The tower should be about 4 ft. square and 15 ft. high and made to revolve on a circular rail way $a$ on a slide $b$ attached to the cogged rim or on balls contained in a circular groove made in the cogged rim or in any convenient way for reducing the friction. The size and proportions however of the several parts of the machine may be varied to suit the views of the constructor.

What I claim as my invention and which I desire to secure by Letters Patent is—

1. The manner in which the movable tower is combined with the hollow stationary shaft B and main shaft C of the machine by making the hollow shaft stationary upon the frame as set forth and causing the tower to revolve upon it and combining the main shaft with the above arrangement by passing it through the hollow shaft in the manner described.

2. I also claim the mode of regulating the position of the wheel in relation to the wind by means of the slide *w* and cams *v x y* connected with the governor bringing into or out of gear alternately the beveled pinions O P and combined with the cogged rim H so as to alter the velocity of the wind wheel as set forth.

PERRY DAVIS.

Witnesses:
CYRUS ALDEN,
ISAAC W. PAGE.